United States Patent [19] [11] Patent Number: 4,886,460
Olgren [45] Date of Patent: Dec. 12, 1989

[54] ELECTRICAL CONNECTOR ASSEMBLY FOR A STEERING WHEEL OCCUPANT CUSHION RESTRAINT SYSTEM

[75] Inventor: Leland N. Olgren, Frankenmuth, Mich.

[73] Assignee: General Motors Corporation, Detroit, Mich.

[21] Appl. No.: 315,677

[22] Filed: Feb. 27, 1989

[51] Int. Cl.$^4$ ............................................. H01R 35/00
[52] U.S. Cl. ............................................................. 439/15
[58] Field of Search ................. 439/4, 13, 15, 16, 162, 439/164

[56] References Cited

U.S. PATENT DOCUMENTS 4,797,109 1/1989 Wende ..................................... 439/15

Primary Examiner—Gary F. Paumen
Attorney, Agent, or Firm—William A. Schuetz

[57] ABSTRACT

An electrical connector arrangement for a steering column occupant cushion restraint system is provided to provide continuous electrical continuity between a sensor and an occupant restraint cushion when the steering wheel shaft is rotated relative to the steering column. The electrical connector arrangement includes a continuous coil which is wound and unwound depending on the direction of which the steering wheel is rotated and includes an automatic locking and unlocking means which automatically prevents any significant relative rotation between the inner and outer housings of the connector arrangement when the electrical connection arrangement is removed for service and which automatically allows relative rotation therebetween in response being connected or reconnected onto the steering column so that the continuous coil cannot be wound tighter while being removed for service.

3 Claims, 2 Drawing Sheets

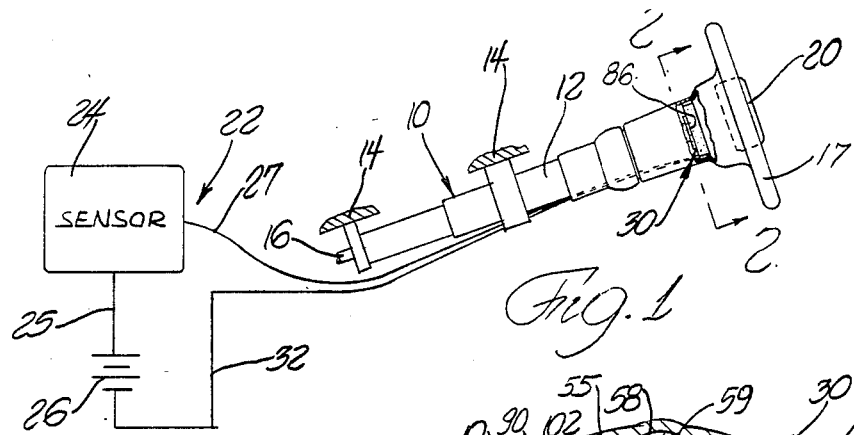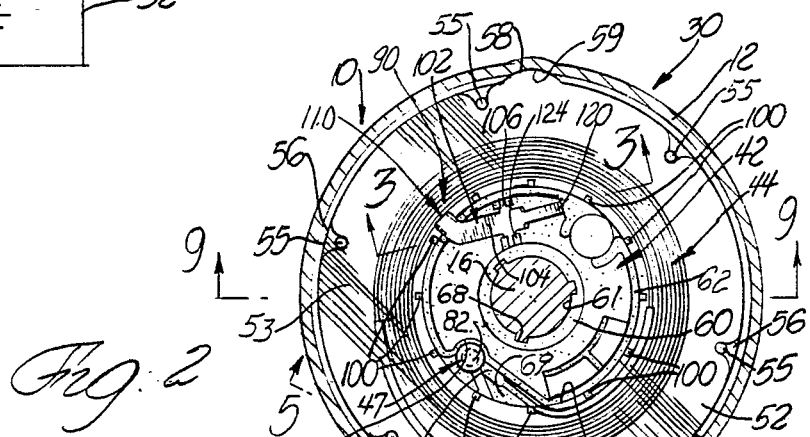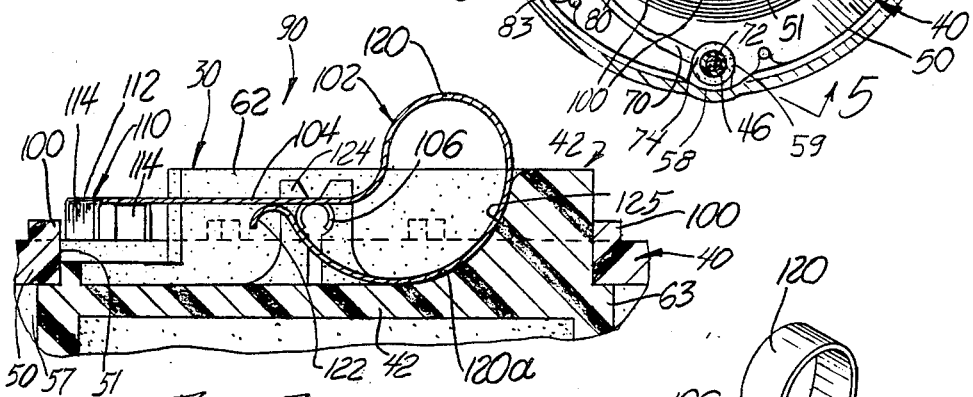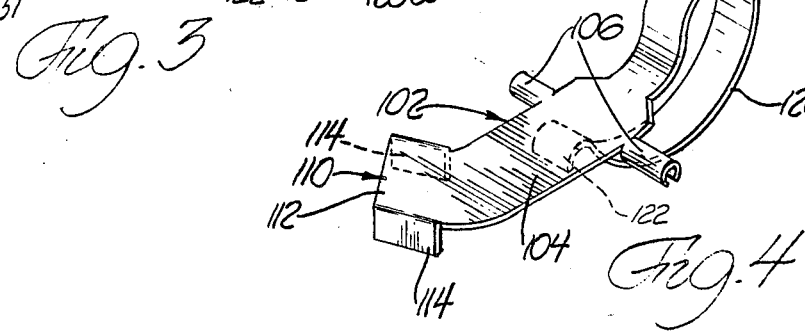

ELECTRICAL CONNECTOR ASSEMBLY FOR A STEERING WHEEL OCCUPANT CUSHION RESTRAINT SYSTEM

The present invention relates to a steering wheel occupant cushion restraint system for a steering column assembly of an automotive vehicle and, more particularly, to an electrical connector arrangement for such a system that is interposed between the steering column and the steering shaft of the steering column assembly for providing continuous electrical continuity between a sensor and an occupant restraint cushion when the steering wheel and shaft are rotated relative to the steering column.

Heretofore, electrical connector arrangements interposed between a steering shaft and a steering column of a vehicle steering column assembly having a steering wheel cushion restraint have been provided for continuously providing electrical continuity between the restraint cushion and a sensor for actuating the cushion restraint. Examples of such arrangements are shown in U.S. Pat. Nos. 4,157,854; 4,218,073; 4,223,911 and 4,657,326.

As shown in U.S. Pat. No. 4,657,326, one type of electrical connector arrangement comprises an outer stationary housing connectable with the steering column, and inner housing or rotor rotatably supported by the outer housing and drivingly connected with the steering shaft, and an electrical conductor supported by the stationary housing and loosely wound a plurality of turns around the inner housing, the conductor having one end connected via an electrical connector with the sensor and its other end connected via an electrical connector with the restraint cushion actuator. When the steering wheel is rotated in one direction the conductor is wound tighter toward the inner housing and when rotated in the other direction, the conductor is loosened and unwound away from the inner housing.

While the electrical connector arrangement shown in U.S. Pat. No. 4,657,326 is satisfactory in operation, a problem can arise when it is necessary to remove the electrical connector arrangement during service on it or the steering column assembly. Since the inner housing is rotatable relative to the outer housing, the coil or conductor could be wound tighter during service and handling thereof. Then, when replaced, it may not have enough slack during full rotation of the steering wheel, in which event, damage to the electrical connector arrangement could occur. For example, in many automotive steering systems, approximately 1.5 turns of the steering wheel is necessary to effect maximum turning of the wheels of the vehicle. When using a coil or wound conductor it is a normal procedure to provide a sufficient length so that approximately 2.5 turns of the steering wheel could be effected in either direction without causing damage to the coil or conductor. It thus can be seen that if more than one revolution of the inner housing relative to the outer housing were to occur during service and then the arrangement reassembled to the steering column assembly, that breakage thereof could occur when effecting a maximum amount of turn.

In accordance with the provisions of the present invention, an electrical connector arrangement of the wound coil type is provided with an automatic locking and unlocking means which automatically prevents any significant relative rotation between the outer and inner housings when the electrical connector arrangement is removed for service and which automatically operates to allow relative rotation between the inner and outer housings in response to being reconnected onto the steering column. The locking means comprises providing the outer housing with a plurality of annularly spaced protrusions or tabs which extend from an outer end face toward the steering column and a spring biased, pivotally supported locking member on the inner housing. The locking member is spring biased so that its locking end engages an adjacent protrusion or tab on the outer housing when the electrical connector arrangement is disengaged from the steering column during service. The locking member at its other end has a steering column engagement portion which extends outwardly of the end of the inner housing and with the engagement portion engaging the steering column to cause the locking member to be pivotally moved against its bias to disengage and clear the locking end thereof from the protrusion or tab on the outer housing so that the housings can rotate relative to each other in response to being connected to the steering column.

Accordingly, it is a broad object of the present invention to provide a new and improved electrical connector arrangement of the wound coil type and which is provided with an automatic locking and unlocking means which automatically prevents any significant relative rotation between the outer and inner housings when the electrical connector arrangement is removed for service and which automatically allows relative rotation therebetween in response to being reconnected onto the steering column.

A further object of the present invention is to provide a new and improved electrical connector arrangement, as defined in the next preceding object, and in which the locking and unlocking means comprises providing the outer housing with a plurality of annularly spaced protrusions or tabs which extend from its end face toward, but spaced from, a transverse abutment on the steering column and a spring biased, pivotally supported locking member on the inner housing which is biased so that one end thereof engages an adjacent protrusion or tab on the outer housing when the electrical connector arrangement is disengaged from the steering column during service, and in which the locking member has a steering column engagement portion adjacent its other end which extends outwardly from the end of the inner housing and which engages the steering column abutment to cause the locking member to be pivotally moved against its bias to clear the one end from the protrusions on the outer housing so that the housings can be rotated relative to each other in response to being connected to the steering column.

Yet another object of the present invention is to provide a new and improved electrical connector arrangement, as defined in the next preceding object, and in which the pivotal locking member is a one piece, spring steel stamped member which is looped at its other end to define both a spring and a steering column engagement portion.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with reference to the accompanying drawings forming a part of this specification and in which similar reference numerals are employed to designate corresponding parts throughout the several views, and in which:

FIG. 1 is a side elevational view of a steering column assembly and cushion restraint system which incorporates the novel electrical connector arrangement of the present invention;

FIG. 2 is an enlarged sectional view taken along the lines 2—2 of FIG. 1;

FIG. 3 is an enlarged fragmentary sectional view taken along the lines 3—3 of FIG. 2;

FIG. 4 is an enlarged perspective view of a locking member of a locking and unlocking means comprising part of the electrical connector arrangement shown in FIG. 2;

Figure 5:
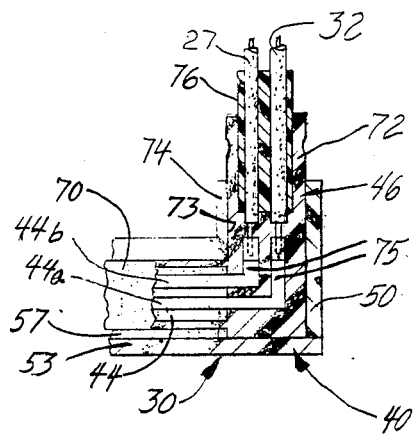
FIG. 5 is an enlarged cross-sectional view taken along the lines 5—5 of FIG. 2.

Referring to FIG. 1 of the drawings, a steering column assembly 10 is there shown. The steering column assembly 10 is provided with a tubular steering column member 12 which is suitably fixed to vehicle support structure 14, a steering shaft 16 (see FIG. 2 and FIGS. 5-7) which extends axially within and is rotatably supported by the steering column 12 in any suitable manner and a steering wheel 17 which is drivingly connected to the steering shaft 16 at its upper end. The lower end of the steering shaft 16 is connected to the wheels (not shown) of an automotive vehicle via a steering gear and linkage (not shown) in a conventional manner so that when the steering wheel 17 is turned it will cause the wheels to be turned.

As shown in FIG. 1, the steering wheel 17 at its hub supports an occupant restraint cushion 20, which is shown in its uninflated condition, and which comprises part of an occupant restraint system 22. The occupant restraint system 22 would also include a suitable sensor 24 mounted on the vehicle. The sensor 24 would be connected via a conductor 25 to one side of a battery 26 and connected via a conductor 27 to an electrical connector arrangement 30 interposed between the steering wheel 17 and the steering column 12. The other side of the battery 26 would also be connected by a conductor 32 to the electrical connector arrangement 30. The cushion restraint 20 would have a suitable actuator (not shown) which would be connected via electrical conductors 34, 36 (see FIGS. 5-7) to the electrical connector arrangement 30.

The electrical connector arrangement 30 provides continuous electrical continuity between the sensor 24 and the actuator (not shown) of the cushion restraint 20 so that when the automotive vehicle experiences a crash situation which activates the sensor, a circuit will be complete to the actuator for the cushion restraint 20 to cause the same to be inflated to protect the driver of the vehicle during the crash.

Figure 6:
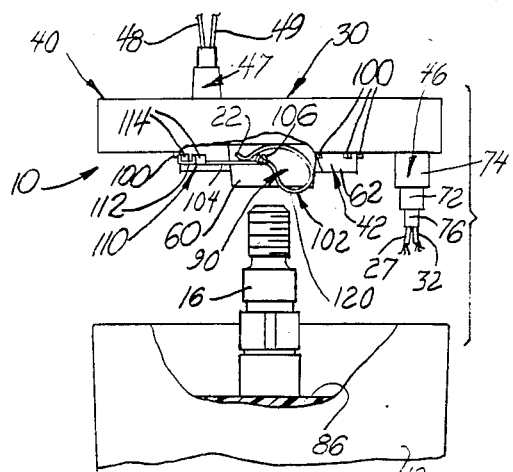
FIGS. 6 through 8 are fragmentary side elevational views of part of the steering column assembly and the electrical connector arrangement of the present invention and in showing the same being assembled to the steering column.

As best shown in FIGS. 2, 5 and 6, the electrical connector arrangement 30 comprises, in general, an outer stationary housing 40, an inner rotatable housing or rotor 42, a continuous electrical conductor means or coil 44 supported by the stationary housing 40 and loosely wound a plurality of times or turns around the inner housing 42, a first plastic electrical connector 46 carried by the outer housing 40 for connecting the conductors 27 and 32 to respective spaced leads or wires 44a, 44b in the coil 44, and a second plastic electrical connector 47 carried by the inner housing 42 for respectively connecting the spaced leads 44a, 44b in the coil 44 to suitable leads 48, 49 connected to the actuator (not shown) of the cushion restraint 20.

Figure 9:
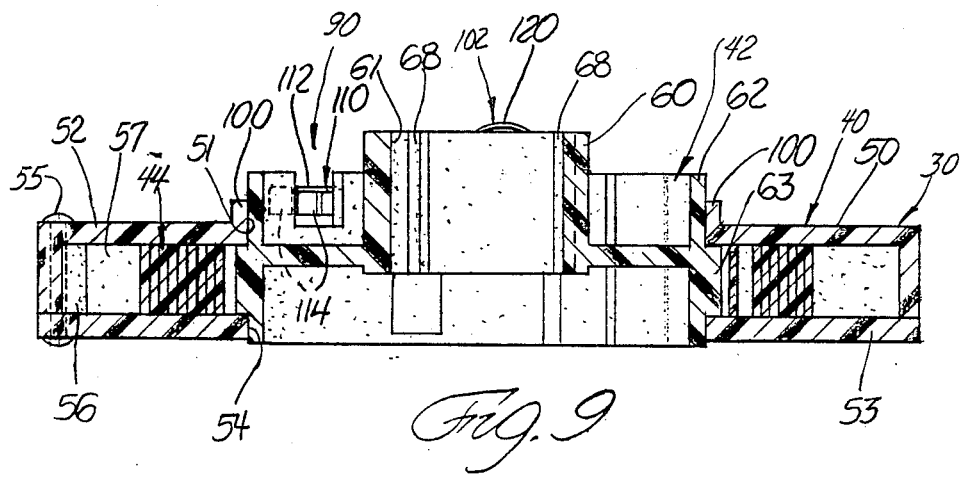
FIG. 9 is a fragmentary sectional view taken approximately along lines 9—9 of FIG. 2.

The outer housing 40 is made from clear plastic and comprises, as viewed in FIGS. 2 and 9, a lower cup shaped member 50 having a central opening 51 through its bottom 52 and a top plate 53 having a central through opening 54 concentric with the opening 51 in the cup shaped member 50. The top plate 53 is suitably secured to the cup shaped member 50 via rivets 55 extending through bosses 56 in the cup shaped member 50 so that the top plate 53 and the bottom of the cup shaped member 50 are held in spaced relation to each other to define an annular donut shaped recess 57 (see FIG. 9). The outer housing 40 has a pair of diametrically opposite outwardly extending bosses 58 which are adapted to be slidably received within aligned complementary shaped depressions 59 in the steering column member 12 so that the housing 40 cannot rotate relative to the steering column 12.

The outer stationary housing 40 rotatably supports the inner housing or stator 42. The inner housing or stator 42 comprises an annular plastic member having a central hub portion 60 provided with a central opening 61 and a generally annular outer side wall 62. The rotor 42 also includes an intermediate, outwardly extending, substantially annular projection 63 intermediate its upper and lower ends which is slidably received within the recess 57 defined by the top plate 53 and the bottom 52 of the outer housing 40 so as to be rotatably supported therebetween. The diameter of the outer side wall 62 is slightly less than the diameter of the central openings 51 and 54 through the bottom 52 and top 53 of the outer housing 40 so that the rotor 42 can freely rotate relatively to the outer housing 40. The central hub portion 60 of the rotor 42 has axially extending key ways 68 formed therein which are adapted to receive complimentary shaped splines on the steering shaft 16 so as to drivingly connect the rotor 42 to the steering shaft 16 when connected thereto. As best shown in FIG. 2, the rotor 42 has a recess 69 adjacent its outer bottom side for receiving and supporting the electrical connector 47 for limited pivotal movement.

As best shown in FIGS. 2 and 5, the electrical connector 46 comprises a one piece plastic member having a first rectangular portion 70 which is molded or otherwise secured to the inner end of the coil 44 and a second bearing portion 72 extending perpendicular to the first portion 70 and which is pivotally received within an opening 73 in a boss portion 74 in the member 50 of the outer housing 40, the opening 73 being in communication with the recess 57 in the housing 40. The first portion 70 is disposed within the recess 57. The electrical connector 46 is thus supported by the housing 40 for limited pivotal movement relative thereto. The electrical connector 46 also includes a pair of metal terminals 75 connected to the lead wires 44a, 44b of the coil 44 and which are adapted to receive the bare wires of the insulated conductors 27, 32, respectively. The insulated conductors 27, 32 are disposed within a circular insulator 76 (see FIG. 6) which is received within the bearing portion 72. To retain the conductors 27, 32 connected to the electrical connector 46, the bearing portion 72 protruding from the housing 40 is crimped.

The electrical connector 47 is of a substantially similar construction to the connector 46. It includes a first portion 80 which is molded or connected to the coil at its outer end and a bearing portion 82 which is connected to a boss 83 on the rotor 42 so as to have limited pivotal movement relative thereto. The first portion 80 is disposed within the recess 69 on the rotor 42 and extends into the recess 57 in the housing 40. The insulated conductors 48, 49, which are connected to the actuator (not shown) for the cushion restraint 20, are electrically connected to the conductors 44a, 44b of the coil 44 and mechanically connected to the bearing portion 82 in the same manner as previously described with the electrical connector 46.

During assembly of the electrical connector arrangement 30, as thus far described, the rotor 42 would first be placed within the lower cup shaped member 50 of the housing 40. The electrical conductor coil 44 would then be positioned around the rotor 42 and with the electrical connector 46 at the outer end of the coil 44 being pivotally received within the boss or bearing 74 on the cup shaped member 50. The electrical connector 47 at the inner end of the coil 44 would then be pivotally connected to the boss 83 formed on the rotor 42 at the end of the recess 69 to connect the coil 44 to the rotor 42 and then the top plate 52 would be assembled to the cup shaped member 50 and secured thereto. Thereafter, the assembly would be slid over the steering shaft 16 and positioned against a transverse wall 86 in the steering column 12. Then the insulated electrical leads 27 and 32 would be connected to the electrical connector 46 to electrically connect the leads 27 and 32 to associated leads 44a, 44b in the coil 44 and then the leads 48, 49 would be connected to the connector 47 in the rotor 42 to electrically connect the actuator (not shown) of the cushion restraint 20 to the associated leads 44a, 44b in the coil 44.

In accordance with the provisions of the present invention, a novel locking and unlocking means 90 is provided in the electrical connection arrangement 30 to automatically prevent any significant relative rotation between the rotor 42 and the outer housing 40 when the electrical connection arrangement 30 is not connected to the column 12 or is removed for service and which automatically allows relative rotation between the rotor 42 and the outer housing 40 in a response to being connected onto the steering column 12. The locking means 90 comprises a plurality of annularly spaced protrusions or nibs 100 formed integral with the bottom surface 52 at its inner edge contiguous with the central through opening 51. In addition, locking means 90 comprises a locking member 102 pivotally supported by the rotor 42. The locking member 102 is of a one piece construction which is stamped and bent from a spring metal, preferably spring steel, to the shape shown in FIG. 4. The locking member 102 includes an intermediate planar portion 104 having a pair of integral curled pivots 106 at its opposite sides. In addition, the locking member 102 at its left end, as viewed in FIG. 4, has a locking end or end portion 110. The locking portion 110 has a top 112 and a pair of spaced sides 114 to define a generally inverted U-shaped end or end portion 110. The locking member 102 also includes a spring 120 at its other or right end portion, as viewed in FIG. 4. The spring 120 is generally kidney shaped and is formed in the shape of a loop which is curled or bent so that its free end 122 slidably engages the underside of the mid portion 104 of the locking member 102. The free end 122 can itself be curled as indicated in FIGS. 3 and 4, so as to be more readily slidable on the underside of the mid portion 104.

The locking member 102 is adapted to be snap fittingly connected to the rotor 42. To this end, the rotor 42 between its outer annular side 62 and its hub 61 has a pair of spaced upright projections 124 which snap fittingly receive the pivots 106 on the locking member 102 to retain the same to the rotor 42. The rotor 42 has a curved boss portion 125 which is shaped complimentary to the shape of the spring 120 and which is engageable by the spring 120 along its lower portion 120a. The spring 120 is self biased toward a normal free state position, as shown in FIGS. 3 and 4, in which the curled lower portion 120a engages the rotor 42 so as to cause the locking end of the lock member 102 to be pivoted into engagement with the bottom surface 52 of the stationary housing 40. When in this position, the U-shaped locking end will either straddle one of the protrusions 100 or be disposed between adjacent protrusions 100. In either event, when in this position, the rotor 42 cannot be rotated relative to the outer housing 40 to any significant extent and thus, is locked against rotation relative to the outer housing 40.

Figure 7:
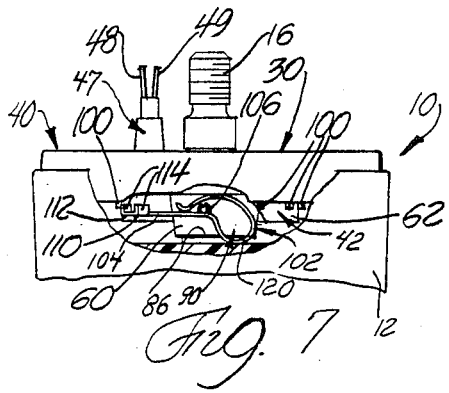
Figure 8:
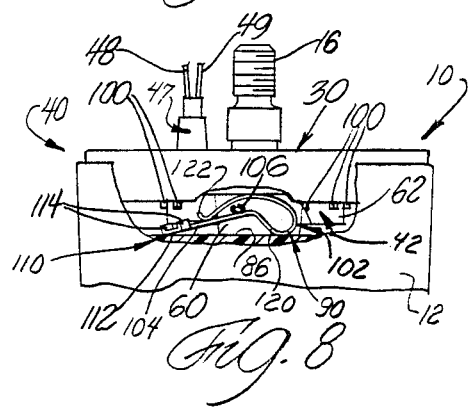

However, when the electrical connector arrangement 30 is assembled to the steering shaft 16 and the steering column 12 (as best shown in FIGS. 6 through 8) the curved spring 120 will engage the transverse wall 86 of the steering column 12, as shown in FIG. 6, and be deflected from its normal free state position, as shown in FIG. 3, to the position shown in FIG. 8. That is, the spring 120 will be curled downwardly into the rotor 42 and with the end 122 sliding along the bottom surface of the mid portion 104 of the locking member 102. This will causes the locking member to be pivoted in a clockwise direction, as viewed in FIGS. 3 and 4, and cause the locking portion 110 to move upwardly and out of engagement with the protrusions 100. Thus when the electrical connector arrangement 30 is assembled onto the steering column assembly, the locking member 102 will at all times be out of engagement with the protrusions 100 so as to enable the rotor 42 to freely rotate relative to the stationary housing 40. During this relative rotational movement, the steering column engagement portion of the spring 120 will merely ride and slide on the wall 86 of the steering column.

The automatic locking and unlocking means 90 of the electrical connector arrangement 30 is important should the electrical connection arrangement 30 or the steering column 12 ever need service. It is normal to provide an electrical coil 44 in such an arrangement which allows approximately two and a half turns of the steering wheel 17 so as to not cause any breakage of the electrical coil 44. Since in a normal vehicle, only one and a half turns of the steering wheel 17 is necessary to effect maximum turning movement of the wheels of the vehicle, the extra turn allows for a safety factor to ensure no damage to the electrical connector arrangement 30.

Without the automatic locking means 90, the rotor 42 could rotate relative to the stationary housing 40 when removed from the steering column 12 during the removal procedure or handling thereafter. This could cause the coil 44 to be wound tighter so than when it is reassembled to the steering shaft 16, it would not allow for a maximum turning movement of the steering wheel without causing breakage thereof. But by providing the automatic locking means 90, the rotor 42 cannot rotate relative to the outer housing 40 during service and thus, when reassembled to the steering shaft 16, it will always be in a position such that subsequent turning of the steering wheel 14 will not cause any breakage of the coil 44.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. In combination with a motor vehicle steering assembly including a steering column member rotatably supporting a steering shaft drivingly connected with a steering wheel having an occupant restraint cushion, said vehicle having a sensor for causing actuation of said occupant restraint cushion, an electrical connector arrangement interposed between said steering column member and said steering shaft which provides electrical continuity between said restraint cushion and said sensor when the steering shaft and wheel are rotated relative to said steering column member, said electrical connector arrangement comprising an outer stationary housing, an inner housing rotatably supported by said outer housing and which is connected with said steering shaft to be rotatable therewith, a current conductor coil carried by said outer housing and wound a plurality of times around said inner housing, a first electrical connector carried by said stationary housing and electrically connected with said sensor and with said conductor coil at its outer end and a second electrical connector carried by said inner housing and electrically connected with said cushion restraint and said conductor coil at its inner end, said conductor being unwound from and wound tighter toward said inner housing when the steering shaft is rotated in first and second directions, respectively, the improvement comprising:
releasable locking means for automatically locking said inner housing to said outer housing to prevent any significant relative rotation therebetween when said electrical connector arrangement is disconnected from said steering column member and for automatically unlocking said inner housing from said outer housing to allow rotation of said inner housing relative to said outer housing when the electrical connector arrangement is operatively connected with said steering column assembly,
said releasable locking means comprising a plurality of annularly spaced, axially extending protrusions on said outer housing and located adjacent to said inner housing, and a locking member made from spring steel, said locking member having an intermediate portion pivotally connected to said inner housing, a locking end portion overlying said protrusions on said outer housing and a spring portion in the shape of a loop whose free end rides on the intermediate portion along its side facing the inner housing, said spring portion of said locking member engaging said inner housing so that it is self biased to a first position in which its outermost loop portion is located axially spaced from said inner housing and said locking end portion of said locking member is in engagement with said outer housing and engageable with said protrusions, said locking member being pivotally movable from its first position to a second position in which its locking end portion is spaced from said outer housing a distance such that it clears said protrusions in response to said spring being compressed by said steering column and with its free end sliding on said intermediate portion of said locking member in response to the spring engaging a transverse abutment on said steering column when the electrical connector arrangement is being connected to said steering column and shaft.

2. The combination as defined in claim 1, and wherein said locking member is of a one piece, stamped metal construction.

3. The combination as defined in claim 2, and wherein said locking end of said locking member has an inverted U-shaped to define a pair of opposed sides which either straddle one of said protrusions or are disposed between two adjacent protrusions on said outer housing when the electrical connector arrangement is disconnected from said steering column.

* * * * *